United States Patent
Okada et al.

(10) Patent No.: US 8,235,164 B2
(45) Date of Patent: Aug. 7, 2012

(54) SNOWMOBILE

(75) Inventors: Hiroyuki Okada, Shizuoka (JP);
Koutaro Ogura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 628 days.

(21) Appl. No.: 11/954,836

(22) Filed: Dec. 12, 2007

(65) Prior Publication Data
US 2009/0152036 A1      Jun. 18, 2009

(51) Int. Cl.
*B62D 5/04* (2006.01)

(52) U.S. Cl. ........................................ 180/443

(58) Field of Classification Search ............... 180/183, 180/190, 443; 464/17
See application file for complete search history.

(56) References Cited

U.S. PATENT DOCUMENTS

| | | | | |
|---|---|---|---|---|
| 3,407,629 A * | 10/1968 | Marchand | | 464/17 |
| 3,795,287 A * | 3/1974 | Rose | | 181/283 |
| 6,502,659 B2 * | 1/2003 | Akasaka | | 180/309 |
| 6,966,399 B2 * | 11/2005 | Tanigaki et al. | | 180/444 |
| 7,096,988 B2 | 8/2006 | Moriyama | | |
| 7,147,074 B1 * | 12/2006 | Berg et al. | | 180/190 |
| 7,413,046 B2 * | 8/2008 | Okada et al. | | 180/182 |
| 7,434,656 B2 * | 10/2008 | Yasuda et al. | | 181/227 |
| 7,669,690 B2 * | 3/2010 | Makabe et al. | | 180/444 |
| 2007/0045037 A1 * | 3/2007 | Yoshinari et al. | | 180/444 |
| 2008/0024080 A1 * | 1/2008 | Ogawa | | 318/432 |

FOREIGN PATENT DOCUMENTS

JP     2005-193788 A      7/2005

* cited by examiner

*Primary Examiner* — Lesley D Morris
*Assistant Examiner* — Daniel Yeagley
(74) *Attorney, Agent, or Firm* — Keating & Bennett, LLP

(57) ABSTRACT

A snowmobile includes steering handlebars; a steering column attached to the steering handlebars and extending directly downward or obliquely downward; a power steering device having a motor and attached to the steering column; a power transmission mechanism arranged to transmit at least the driving force of the motor; and a ski coupled to the power transmission mechanism to be turned by the power transmission mechanism. The power steering device includes a sensor arranged to detect the rotation of the steering column. The motor has a motor shaft tilted from both the fore and aft direction and the left and right direction of the vehicle.

24 Claims, 11 Drawing Sheets

SNOWMOBILE

BACKGROUND OF THE INVENTION

1. Field of the Invention

The present invention relates to a snowmobile.

2. Description of the Related Art

Snowmobiles for running on snow are conventionally known. A snowmobile includes a pair of left and right skis disposed at the front bottom of the vehicle body, and steering handlebars for steering the skis. The steering handlebars and the skis are coupled via a link mechanism.

In recent years, proposals have been made to provide a power steering device to the link mechanism in order to reduce the force required to steer the skis. U.S. Pat. No. 7,096,988 B2 discloses a snowmobile in which a power steering device is mounted at the lower end of a handlebar column for supporting steering handlebars. JP-A-2005-193788 (see Abstract and FIGS. 1 and 2) discloses a snowmobile including an electric power steering device disposed in an engine compartment.

In the snowmobile disclosed in U.S. Pat. No. 7,096,988 B2, an electric motor of the power steering device projects forward as seen in a plan view. The axis of the electric motor extends in the fore and aft direction of the vehicle.

In the snowmobile disclosed in JP-A-2005-193788 (see Abstract), an electric motor of the power steering device projects in the left and right direction of the vehicle. That is, the axis of the electric motor extends in the left and right direction.

In the conventional snowmobiles described above, however, the electric motor projects greatly in the fore and aft direction or in the left and right direction, and therefore a large space is required to install the power steering device. In addition, in an attempt to reduce the size of the snowmobile, the power steering device must be disposed close to other vehicle components. Therefore, the power steering device hinders maintenance or the like of the vehicle components. Thus, maintenance or the like of the vehicle components is not easy in the conventional snowmobiles described above.

SUMMARY OF THE INVENTION

In order to overcome the problems described above and to improve upon the conventional devices, preferred embodiments of the present invention provide a snowmobile having a greatly reduced installation space required for a power steering device and a configuration that facilitates maintenance of a snowmobile including a power steering device.

A snowmobile in accordance a preferred embodiment of the present invention includes steering handlebars; a steering column attached to the steering handlebars and extending directly downward or obliquely downward; a power steering device attached to the steering column and including a sensor arranged to detect rotation of the steering column, and a motor having a motor shaft tilted from both a fore and aft direction and a left and right direction of the vehicle and driven based on a detection result of the sensor; a power transmission mechanism arranged to transmit at least a driving force of the motor; and a ski coupled to the power transmission mechanism to be turned by the power transmission mechanism.

A snowmobile in accordance with another preferred embodiment of the present invention includes an engine having a crankshaft; steering handlebars; a steering column attached to the steering handlebars and extending directly downward or obliquely downward; a power steering device attached to the steering column and including a sensor arranged to detect rotation of the steering column, and a motor having a motor shaft tilted with respect to the crankshaft and driven based on a detection result of the sensor; a power transmission mechanism arranged to transmit at least a driving force of the motor; and a ski coupled to the power transmission mechanism to be turned by the power transmission mechanism.

Still another snowmobile in accordance with yet another preferred embodiment of the present invention includes an engine having a plurality of cylinders arranged along a predetermined cylinder bank direction; steering handlebars; a steering column attached to the steering handlebars and extending directly downward or obliquely downward; a power steering device attached to the steering column and including a sensor arranged to detect rotation of the steering column, and a motor having a motor shaft tilted with respect to the cylinder bank direction of the engine and driven based on a detection result of the sensor; a power transmission mechanism arranged to transmit at least a driving force of the motor; and a ski coupled to the power transmission mechanism to be turned by the power transmission mechanism.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 1:
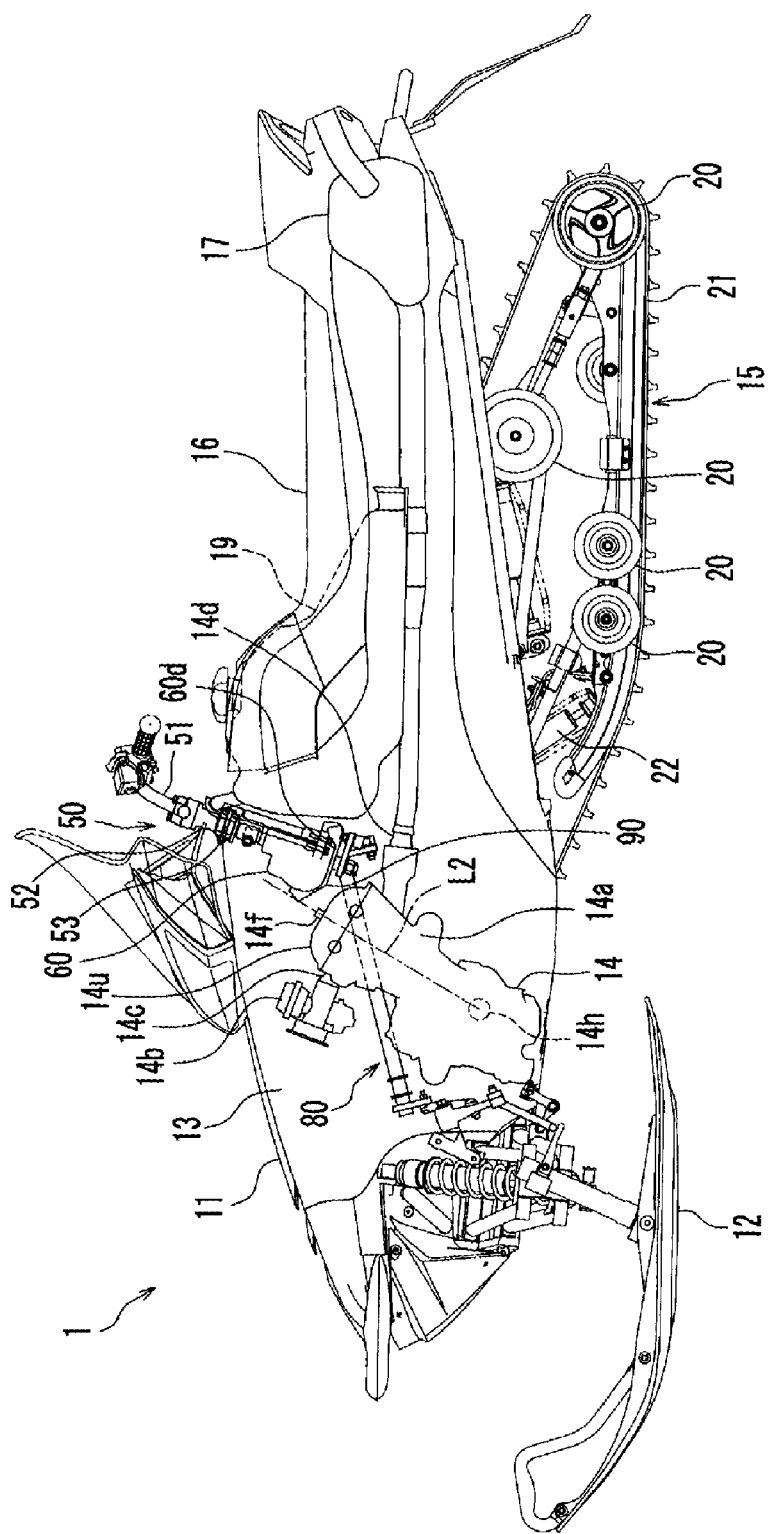
FIG. 1 is a left side view of a snowmobile in accordance with a first preferred embodiment of the present invention.
Figure 2:
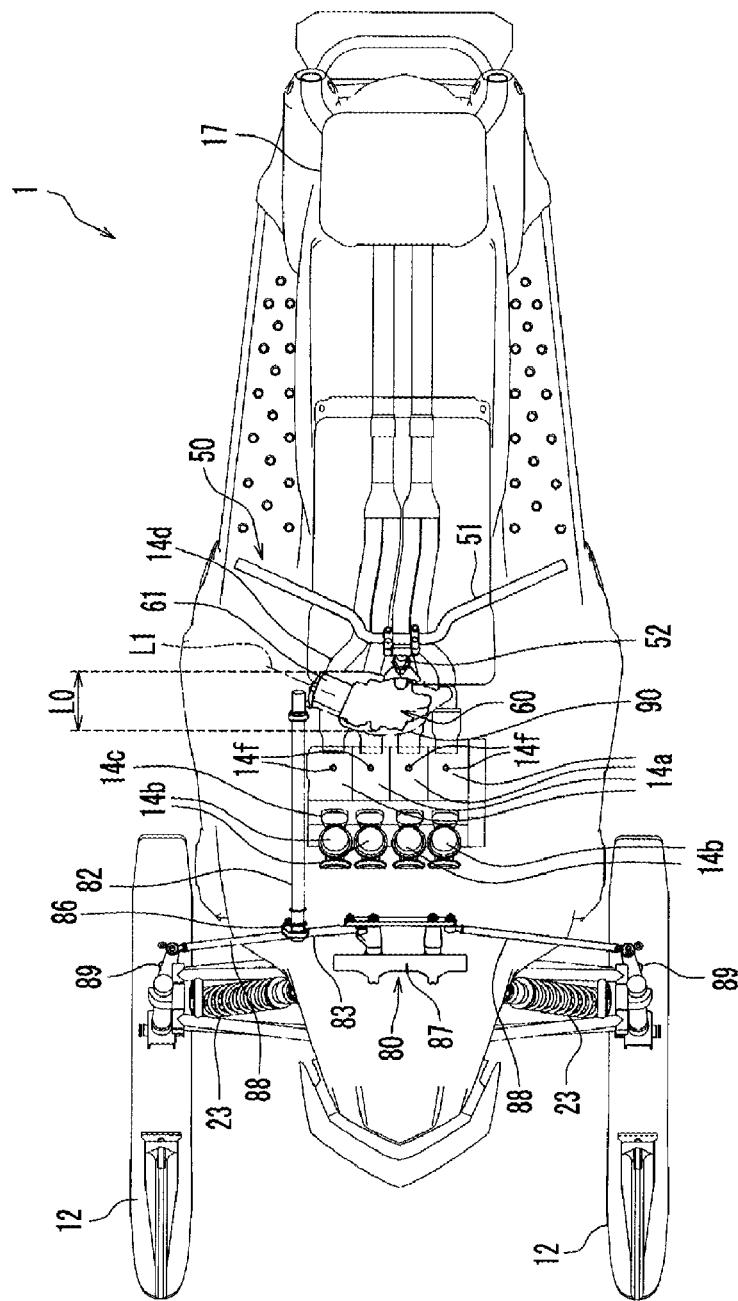
FIG. 2 is a plan view of the snowmobile in accordance with the first preferred embodiment of the present invention.
Figure 3:
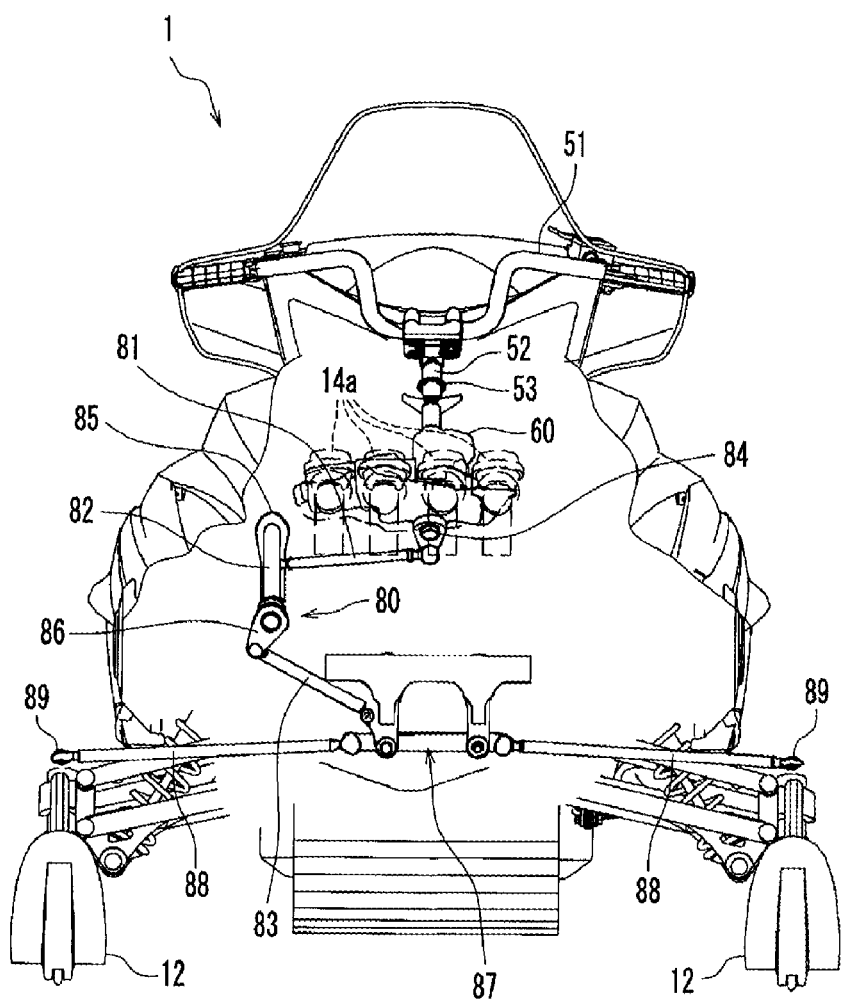
FIG. 3 is a front view of the snowmobile in accordance with the first preferred embodiment of the present invention.

As shown in FIGS. 1 to 3, a snowmobile 1 in accordance with a first preferred embodiment of the present invention preferably includes a vehicle body 11, a steering device 50 having a pair of left and right skis 12 disposed at the lower front side of the vehicle body 11, an engine 14 disposed in an engine compartment 13 of the vehicle body 11, a drive track device 15 to be driven by the engine 14, and a seat 16 provided at the upper rear side of the vehicle body 11. A fuel tank 19 is disposed forward of the seat 16. In the following description, the terms "fore and aft" and "left and right" respectively refer to the fore and aft direction and the left and right direction as seen from the rider seated on the seat 16.

The drive track device 15 supports the rear part of the vehicle body 11. The drive track device 15 includes a plurality of wheels 20, and a track belt 21 wound around the wheels 20. Reference numeral 22 denotes a cushion unit.

The engine 14 preferably is a four cycle, four cylinder engine. The engine 14 includes a crankshaft 14h extending in the left and right direction of the vehicle, and four cylinders 14a each extending obliquely upward and rearward. The left and right direction of the vehicle corresponds to the vehicle width direction, and therefore is hereinafter occasionally referred to as "vehicle width direction". As shown in FIG. 2, the cylinders 14a are arranged to extend in the vehicle width direction. That is, in the snowmobile 1, the cylinder bank direction coincides with the vehicle width direction. An intake pipe 14c provided with a carburetor 14b is connected to the front side of each of the cylinders 14a. An exhaust pipe 14d is connected to the rear side of the cylinders 14a. The exhaust pipe 14d extends rearward from the cylinders 14a, and a muffler 17 is provided at the rear end of the exhaust pipe 14d.

Figure 4:
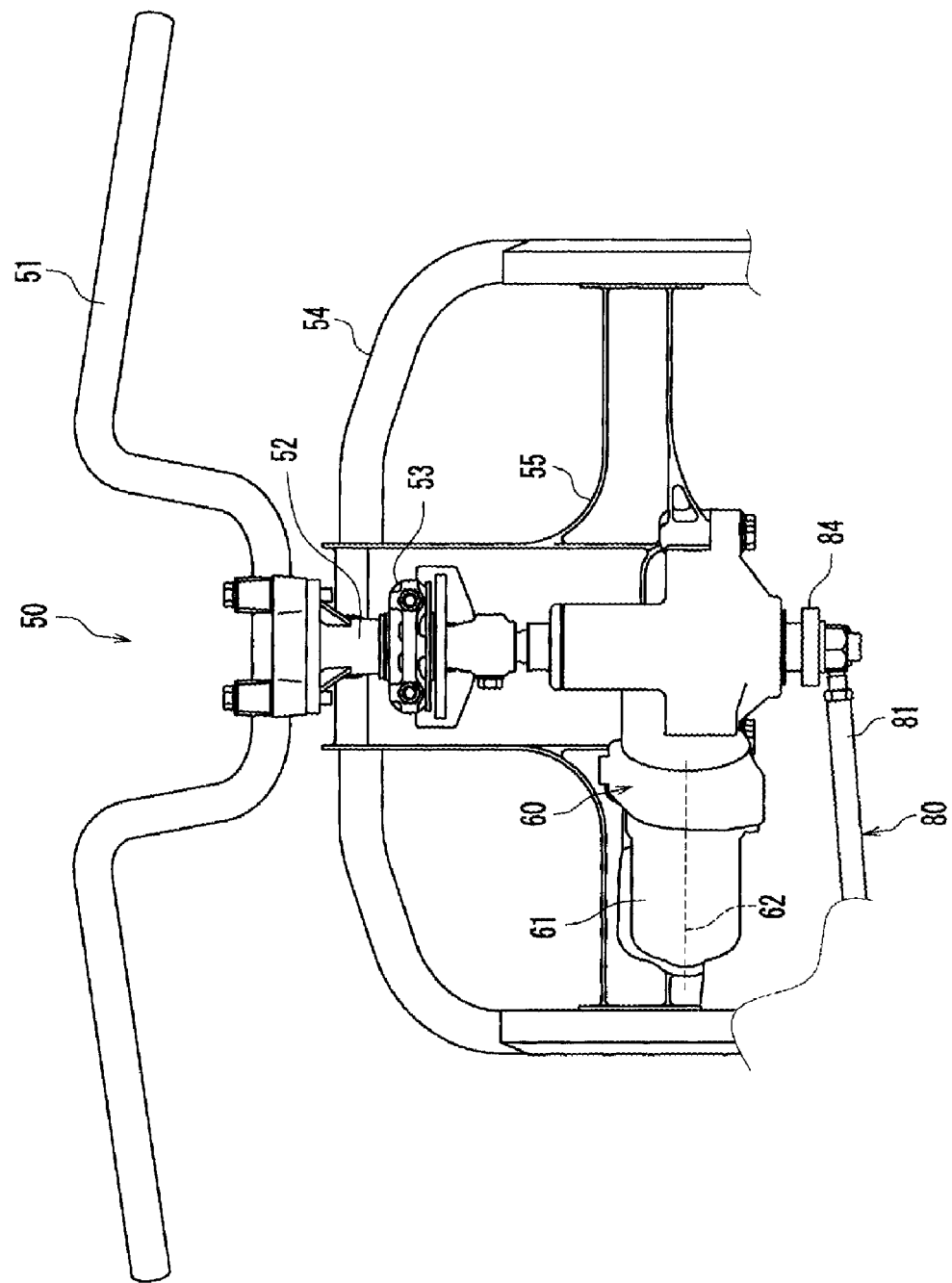
FIG. 4 is a front view of a steering column and a power steering device.

As shown in FIG. 4, the steering device 50 includes steering handlebars 51, a steering column 52 for supporting the steering handlebars 51, a bearing 53 for supporting the steering column 52 for free rotation, a power steering device 60 coupled to the steering column 52, and a power transmission mechanism 80 for coupling the power steering device 60 and the skis 12.

The power steering device 60 in accordance with this preferred embodiment assists the rider to perform a steering operation. That is, when the rider rotates the steering handlebars 51 in the left direction or in the right direction, the power steering device 60 applies to the steering handlebars 51a rotating force in the same direction that is larger than the rotating force applied by the rider. In this way, in this preferred embodiment, both the rotating force by the rider and the driving force of the power steering device 60 are transmitted to the skis 12. However, the power steering device 60 in accordance with various preferred embodiments of the present invention may generate all the rotating force of the steering handlebars 51. In other words, in turning the skis 12, no force generated by the rider but only the driving force of the power steering device 60 may be transmitted to the skis 12.

The power steering device 60 preferably includes an electric motor 61 as an actuator. As shown in FIG. 2, the power steering device 60 is attached to the steering column 52, such that the smallest dimension of the power steering device 60 is oriented in a fore and aft direction, so that the power steering device 60 length L0 in the fore and aft direction is smallest as compared to any other arrangement. A motor shaft 62 (see FIG. 4) of the electric motor 61 is tilted from both the fore and aft direction and the left and right direction of the vehicle, so as to not project forward or rearward the smallest length. Symbol L1 in FIG. 2 represents the axial direction of the motor shaft 62. In this way, in the present preferred embodiment, the power steering device 60 is installed such that its length L0 in the fore and aft direction is the smallest possible and such that the motor shaft 62 of the electric motor 61 is tilted from both the fore and aft direction and the left and right direction of the vehicle, instead of being installed such that the motor shaft 62 extends along the fore and aft direction or the left and right direction of the vehicle.

As shown in FIG. 4, a steering gate 54 is disposed below the steering handlebars 51. The steering gate 54 supports the steering column 52. Since the steering column 52 supports the steering handlebars 51, the steering gate 54 indirectly supports the steering handlebars 51. A support bracket 55 of an inverted T shape is welded to the steering gate 54. The support bracket 55 preferably is a unitary die cast piece of aluminum. That is, the support bracket 55 preferably is a single unitary member. The material of the support bracket 55 does not necessarily have to be aluminum. The support bracket 55 may be a die cast piece of a material other than aluminum. However, the weight of the support bracket 55 can be reduced by adopting the support bracket 55 made of a die cast piece of aluminum.

Figure 5:
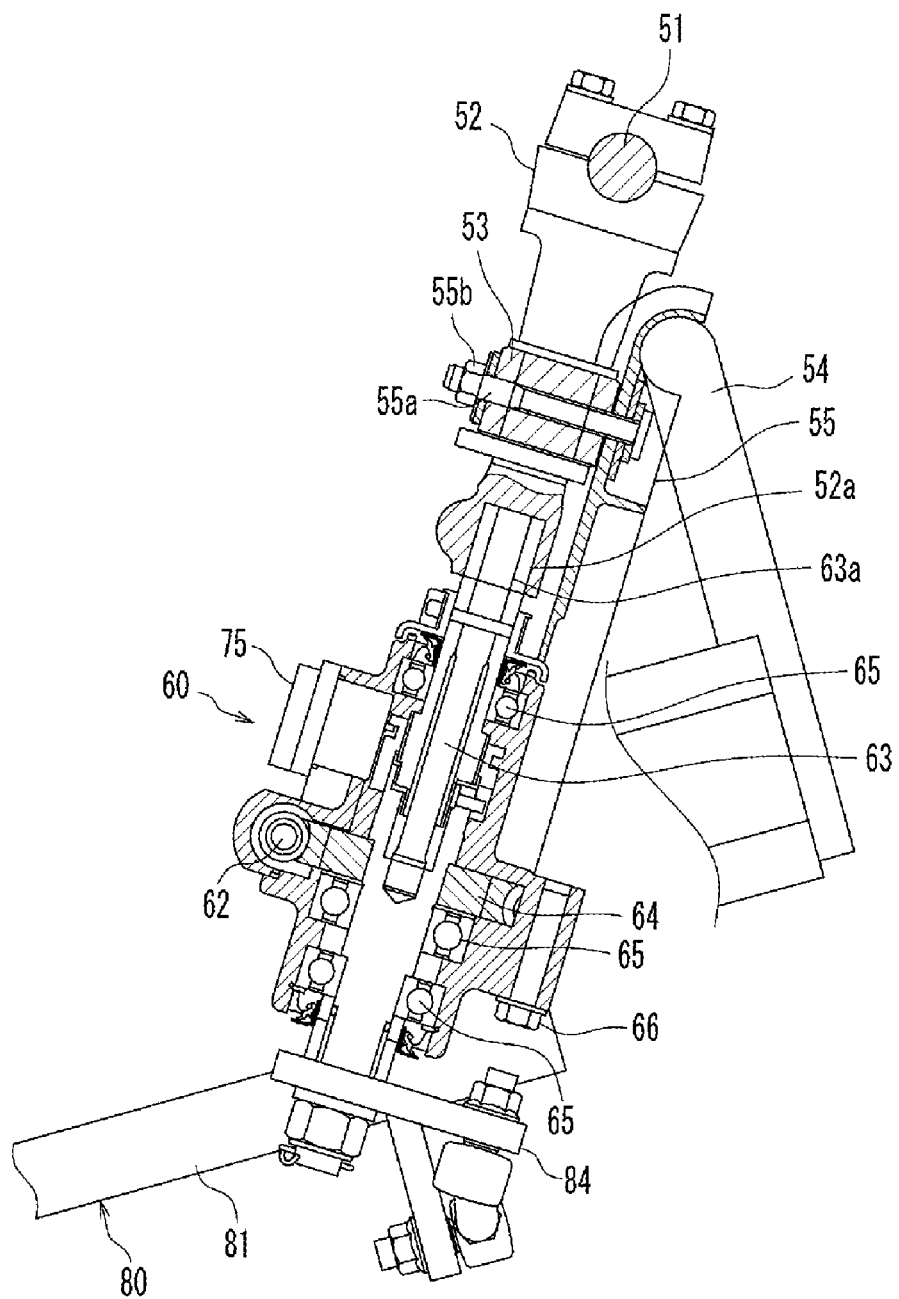
FIG. 5 is a cross sectional view of the steering column and the power steering device.

As shown in FIG. 5, the bearing 53 for supporting the steering column 52 is fixed to the support bracket 55 by a bolt 55a and a nut 55b. The support bracket 55 thus supports the bearing 53. In addition, the power steering device 60 is fixed to the support bracket 55 by a bolt 66. That is, the support bracket 55 also supports the power steering device 60. In this way, the bearing 53 and the power steering device 60 are both supported by the support bracket 55. In other words, the bearing 53 and the power steering device 60 are both supported by the same member. The power steering device 60 is supported as it is suspended from the support bracket 55.

As shown in FIG. 5, the power steering device 60 includes a rotary shaft 63 disposed coaxially with the steering column 52. The rotary shaft 63 and the steering column 52 are arranged on the same line, and are spline connected to each other. Specifically, a spline shaft part 63a formed with spline grooves on its outer peripheral surface is provided at the upper end of the rotary shaft 63, a hole part 52a formed with spline grooves on its inner peripheral surface is provided in the steering column 52, and the spline shaft part 63a is fitted in the hole part 52a with their spline grooves meshed with each other.

As shown in FIG. 5, the power steering device 60 includes a gear 64 fixed to the rotary shaft 63 concentrically therewith. The gear 64 is meshed with the motor shaft 62 to rotate as the motor shaft 62 rotates. In this way, the rotation of the motor shaft 62 causes the gear 64 to rotate, which in turn causes the rotary shaft 63 to rotate. Reference numeral 65 denotes a bearing for supporting the rotary shaft 63 for free rotation. The power steering device 60 further includes a torque sensor 75 as a sensor for detecting the rotation of the steering column 52. As the rider rotates the steering handlebars 51, the rotating force is transmitted via the steering column 52 and the rotary shaft 63 to the torque sensor 75. The power steering device 60 controls the electric motor 61 (see FIG. 4) based on the detection results by the torque sensor 75. The sensor for detecting the rotation of the steering column 52 is not limited to a torque sensor. The sensor for detecting the rotation of the steering column 52 may be, for example, a sensor for detecting the rotating angle of the rotary shaft 63.

As shown in FIGS. 4 and 5, the lower end of the rotary shaft 63 is coupled to a first rod 81 of the power transmission mechanism 80 via a lever 84. As shown in FIGS. 1 to 3, the power transmission mechanism 80 includes a so-called link mechanism.

As shown in FIG. 3, the power transmission mechanism 80 includes the first rod 81 coupled to the lower end of the rotary shaft 63 via the lever 84 and extending generally rightward from the lever 84, a second rod 82 coupled to the right end of the first rod 81 via a lever 85 and extending obliquely forward and downward from the lever 85, and a third rod 83 coupled to the front end of the second rod 82 via a lever 86 and extending obliquely leftward and downward from the lever

86. A parallel link 87 is coupled to the third rod 83, and a tie rod 88 is coupled to each of the left side and the right side of the parallel link 87.

As shown in FIG. 2, the right end of the right tie rod 88 is coupled to a knuckle arm 89 of the right ski 12. Likewise, the left end of the left tie rod 88 is coupled to a knuckle arm 89 of the left ski 12. The skis 12 are attached to the cushion unit 23 for free rotation in the vertical direction and in the horizontal direction to support the front part of the vehicle body 11 via the cushion unit 23. As the rotary shaft 63 of the power steering device 60 rotates, the rotation is transmitted sequentially to the lever 84, the first rod 81, the lever 85, the second rod 82, the lever 86, the third rod 83, the parallel link 87, and the tie rods 88, which then reciprocate in the left and right direction. This causes the skis 12 to turn leftward and rightward.

In the snowmobile 1 in accordance with the present preferred embodiment, when the rider seated on the seat 16 steers the handlebars 51 while the vehicle is running, the resultant force of the steering force applied to the rotary shaft 63 of the power steering device 60 and the power of the electric motor 61 is transmitted via the power transmission mechanism 80 to the left and right skis 12. This causes the left and right skis 12 to rotate in the same direction as the handlebars 51.

As shown in FIG. 1, the snowmobile 1 in accordance with the present preferred embodiment is provided with a heat shield cover 90 disposed between the power steering device 60 and the engine 14. In this preferred embodiment, a part of the heat shield cover 90 is disposed between the power steering device 60 and the exhaust pipe 14d.

Figure 6:
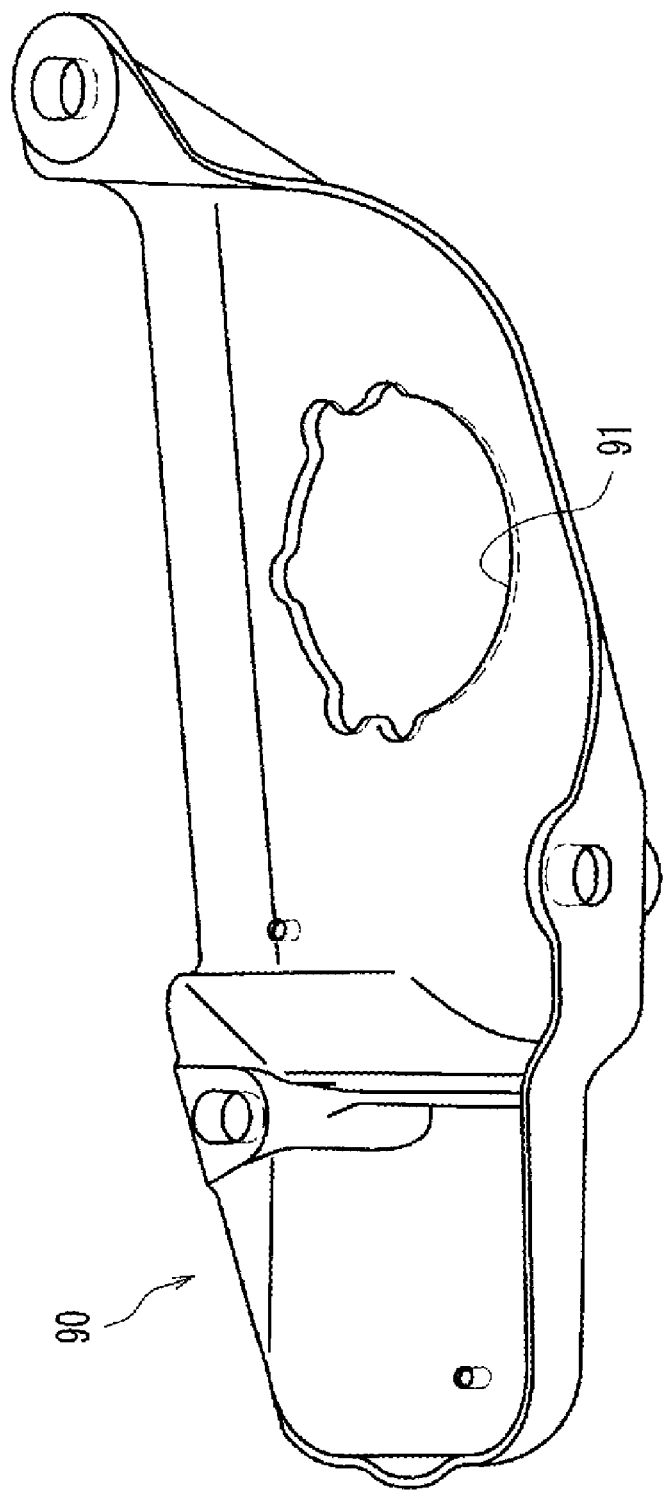
FIG. 6 is a perspective view of a heat shield cover.

The heat shield cover 90 in accordance with this preferred embodiment is disposed below the power steering device 60, and formed in the shape of a downwardly convex cup. In FIG. 1, the heat shield cover 90 is shown in cross section taken along a plane extending in the fore and aft direction in order to illustrate the vertical positional relation between the power steering device 60 and the heat shield cover 90. The shape of the heat shield cover 90 is not specifically limited. The heat shield cover 90 covers the lower side of but not the upper side of the power steering device 60. The heat shield cover 90 extends from a position below the lower end 60d of the power steering device 60 to a position above the upper end 14u of the engine 14. FIG. 6 is a perspective view of the heat shield cover 90. The heat shield cover 90 is formed with a hole 91, through which the lower end of the rotary shaft 63 of the power steering device 60 penetrates the heat shield cover 90.

As shown in FIG. 2, according to the snowmobile 1 in accordance with the present preferred embodiment, the extending direction L1 of the motor shaft 62 of the power steering device 60 is tilted from the left and right direction of the vehicle. In other words, the extending direction L1 of the motor shaft 62 is tilted from the extending direction of the crankshaft 14h of the engine 14, and also tilted with respect to the cylinder bank direction of the engine 14 (that is, the direction in which the four cylinders 14a are arranged). Also, the extending direction L1 of the motor shaft 62 of the power steering device 60 is tilted from the fore and aft direction of the vehicle. Therefore, the motor shaft 62 projects in neither the fore and aft direction nor the left and right direction of the vehicle. This contributes to the reduction in installation space required for the power steering device 60. In addition, as shown in FIG. 1, the power steering device 60 is disposed close to other vehicle components, for example the engine 14. However, according to this snowmobile 1, since the power steering device 60 is disposed in a compact manner, some space is secured between the power steering device 60 and other vehicle components. Thus, the power steering device 60 does not hinder maintenance or the like of the vehicle components. The maintainability of the vehicle is thus improved.

In this preferred embodiment, in particular, the power steering device 60 is attached to the steering column 52 such that its length in the fore and aft direction is smallest. Therefore, the power steering device 60 does not project excessively in either forward or rearward directions. Thus, vehicle components disposed forward or rearward of the power steering device 60 can be easily upsized. As shown in FIG. 1, in this preferred embodiment, the fuel tank 19 is disposed rearward of the power steering device 60. In this preferred embodiment, since the power steering device 60 does not project rearward, the fuel tank 19 can be increased in size.

In addition, as shown in FIG. 1, according to the snowmobile 1 in accordance with this preferred embodiment, the power steering device 60 is arranged so as not to overlap an ignition plug 14f of the engine 14 as seen in the extending direction L2 of the ignition plug 14f. Therefore, the power steering device 60 does not hinder the ignition plug 14f from being pulled out during maintenance or the like of the vehicle. Also, the power steering device 60 does not make it difficult to pull out the ignition plug 14f. Since the heat shield cover 90 projects forward relative to the power steering device 60, it is preferable to remove the heat shield cover 90 before pulling out the ignition plug 14f.

As shown in FIGS. 4 and 6, in this snowmobile 1, the steering column 52 is supported by the bearing 53, which is supported by the support bracket 55. The power steering device 60 is supported by the support bracket 55. That is, the power steering device 60 and the bearing 53 are both supported by the same part, namely the support bracket 55. The support bracket 55 preferably is a single unitary member, and not a part formed by welding together a plurality of members. Specifically, the support bracket 55 is a die cast piece of aluminum. Therefore, the machining accuracy of the support bracket 55 is high. Thus, the accuracy of the relative positional relationship between the bearing 53 and the power steering device 60 is high, and as a result, the accuracy of the positional relationship between the steering column 52 supported by the bearing 53 and the rotary shaft 63 of the power steering device 60 is also high. As a result, according to the present preferred embodiment, the steering column 52 and the rotary shaft 63 of the power steering device 60 can be connected coaxially with each other, even without using a universal joint or the like. According to this preferred embodiment, the steering column 52 and the rotary shaft 63 of the power steering device 60 can be disposed coaxially with each other with sufficient accuracy via the spline connection. Since the accuracy between the steering column 52 and the rotary shaft 63 can be secured, the steering column 52 does not have to be made long to secure the coaxial relationship between them and thus can be made relatively short.

As shown in FIG. 1, according to this snowmobile 1, the heat shield cover 90 is disposed between the power steering device 60 and the engine 14. Therefore, heat transmission from the engine 14 to the power steering device 60 can be restricted. In this preferred embodiment, the power steering device 60 is disposed obliquely rearward of and above the engine 14, and therefore easily exposed to air ascending after being heated by the engine 14. However, the heat shield cover 90 in accordance with this preferred embodiment is disposed below the power steering device 60, and effectively restricts the ascent of the heated air from below the power steering device 60. Thus, it is possible to effectively prevent the power steering device 60, specifically the motor 61, from overheating.

In addition, the heat shield cover 90 of this preferred embodiment covers the lower side of, but not the upper side of, the power steering device 60, instead of covering the entirety of the power steering device 60. That is, the upper side of the power steering device 60 is not covered. Therefore, heat of the power steering device 60 can be released upward. Thus, it is possible to effectively prevent the power steering device 60 from overheating.

As shown in FIG. 1, in the snowmobile 1 in accordance with the present preferred embodiment, the engine 14 is disposed obliquely forward of and below the power steering device 60, with the upper end 14u of the engine 14 positioned below the upper end of the power steering device 60 and above the lower end 60d thereof. Accordingly, the heat shield cover 90 extends from a position below the lower end 60d of the power steering device 60 to a position above the upper end 14u of the engine 14. The heat shield cover 90 thus shaped can effectively shield the power steering device 60 from heat from the engine 14.

Moreover, the heat shield cover 90 preferably has a downwardly convex cup shape. Thus, the heat shield cover 90 can suitably achieve the above-described effects.

Furthermore, the heat shield cover 90 also serves as a partition between the power steering device 60 and the exhaust pipe 14d. In other words, a portion of the heat shield cover 90 is disposed between the power steering device 60 and the exhaust pipe 14d. Therefore, heat transmission from the exhaust pipe 14d to the power steering device 60 can also be restricted.

Second Preferred Embodiment

Figure 7:
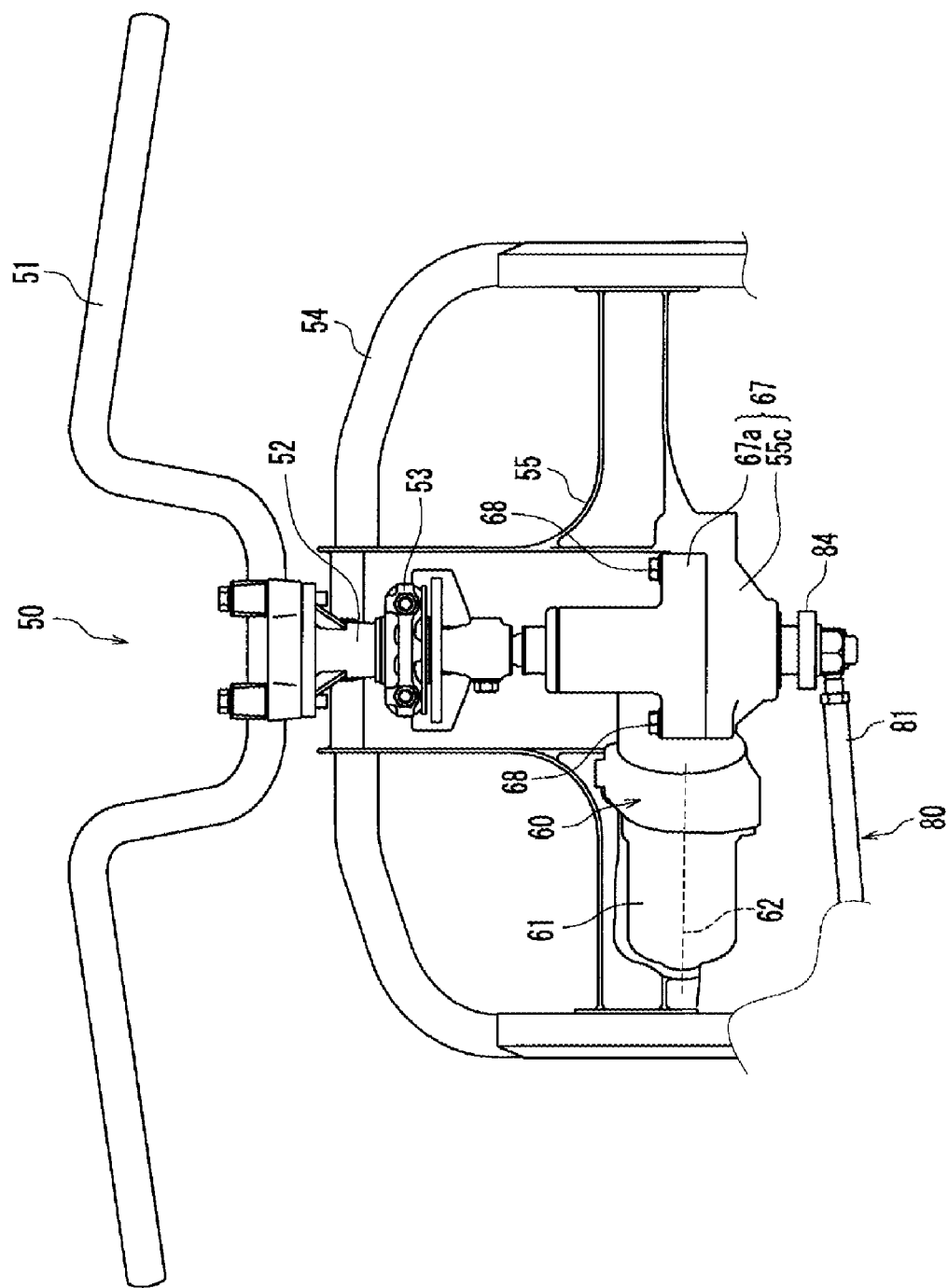
FIG. 7 is a front view of a steering column and a power steering device in accordance with a second preferred embodiment of the present invention.

The snowmobile 1 in accordance with a second preferred embodiment is the snowmobile 1 of the first preferred embodiment in which the power steering device 60 is modified. As shown in FIG. 7, in the second preferred embodiment, a part 55c of a casing 67 of the power steering device 60 is formed by a part of the support bracket 55.

Specifically, the casing 67 of the power steering device is made up of a plurality of members including a first casing member 67a and a second casing member 55c, which are assembled to each other. The second casing member 55c is a part of the support bracket 55, which is a die cast piece of aluminum. The first casing member 67a and the second casing member 55c are fixed to each other by bolts 68. However, the first casing member 67a and the second casing member 55c may be fixed to each other by means of other than the bolts 68.

Other components are the same as those of the first preferred embodiment, and are not described.

In the snowmobile 1 in accordance with this preferred embodiment, the power steering device 60 includes the casing 67 made up of a plurality of members that can be assembled to each other, and a part 55c of the plurality of members is a part of the support bracket 55 as a vehicle component. Therefore, according to this preferred embodiment, the power steering device 60 can be assembled to the support bracket 55 with further improved accuracy, and the rotary shaft 63 of the power steering device 60 and the steering column 52 can be made coaxial with each other with high accuracy.

The support bracket 55, which forms a part of the casing 67 of the power steering device 60, is a die cast piece of aluminum. Therefore, the machining accuracy of the support bracket 55 is high. Thus, it is possible to make the rotary shaft 63 of the power steering device 60 and the steering column 52 coaxial with each other with higher accuracy.

In addition, according to this preferred embodiment, since a part of the support bracket 55 also serves as a part 55c of the casing 67 of the power steering device 60, the number of parts can be reduced. The reduction in number of parts contributes to the weight reduction.

In this preferred embodiment, the vehicle component that serves as a part 55c of the casing 67 of the power steering device 60 preferably is the support bracket 55. However, the vehicle component that also serves as a part 55c of the casing 67 of the power steering device 60 is not limited to the support bracket 55. For example, the vehicle component that also serves as a part of the casing 67 of the power steering device 60 may be the steering gate 54 or the chassis of the snowmobile 1.

Third Preferred Embodiment

The snowmobile 1 in accordance with the third preferred embodiment is the snowmobile 1 of the first preferred embodiment in which a fan is used to cool the power steering device 60. Other components are the same as those of the first preferred embodiment, and are given the same reference numerals and are not described.

Figure 8:
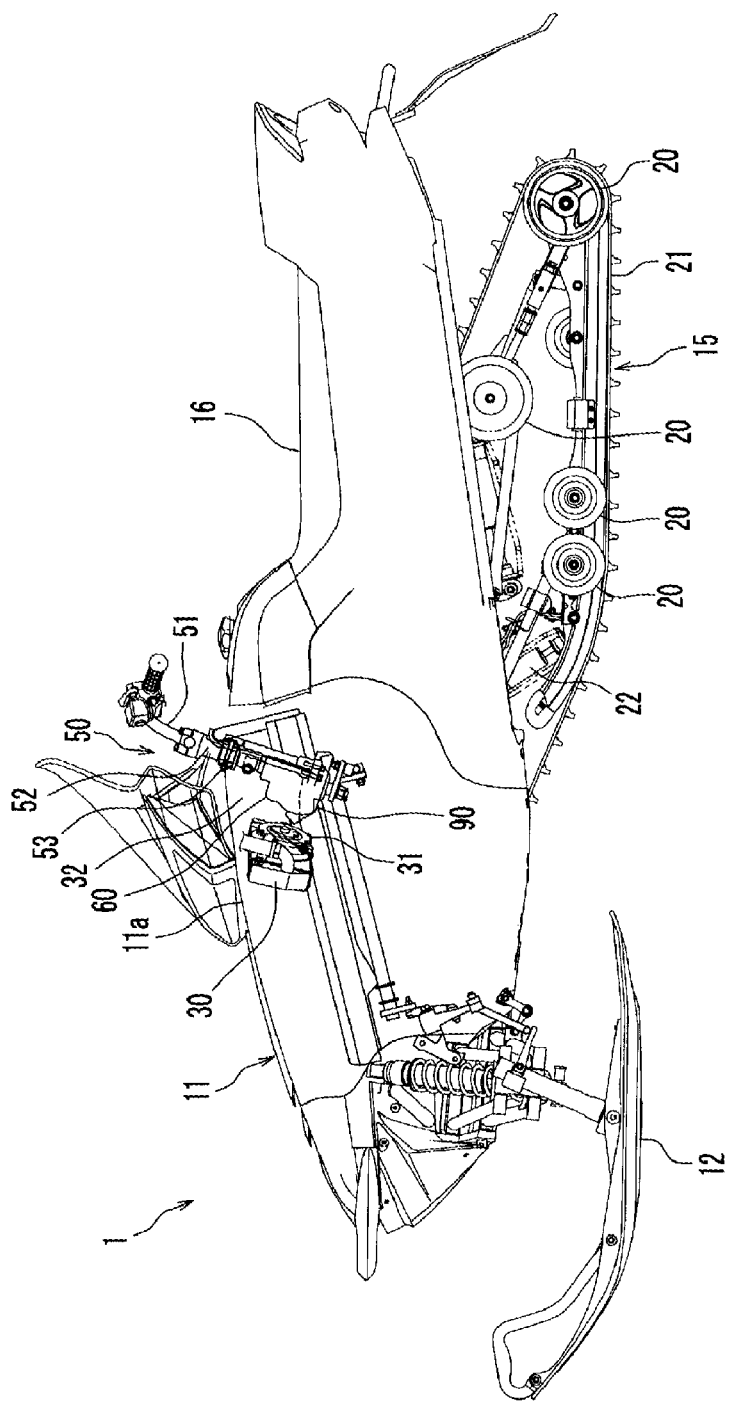
FIG. 8 is a left side view of a snowmobile in accordance with a third preferred embodiment of the present invention.

In the case where the engine 14 is a water-cooled engine, as shown in FIG. 8, the snowmobile 1 is provided with a radiator 30 for cooling coolant to be supplied to the engine 14 (see FIG. 1), and a fan 31 arranged to supply air to the radiator 30. In FIG. 8, the engine 14 is not shown. In this preferred embodiment, the fan 31 for cooling the radiator 30 is also used as a fan for cooling the power steering device 60. The vehicle body 11 includes a vehicle body cover 11a, inside which an air chamber 32 for guiding air supplied from the fan 31 is disposed. The power steering device 60 is disposed in the air chamber 32 so as to be cooled by the air supplied from the fan 31. The fan 31 is disposed forward of the power steering device 60.

According to the snowmobile 1 in accordance with this preferred embodiment, since air is supplied from the fan 31 to the power steering device 60, the power steering device 60 can be effectively cooled. Therefore, it is possible to more reliably prevent the motor 61 of the power steering device 60 from overheating.

Figure 9:
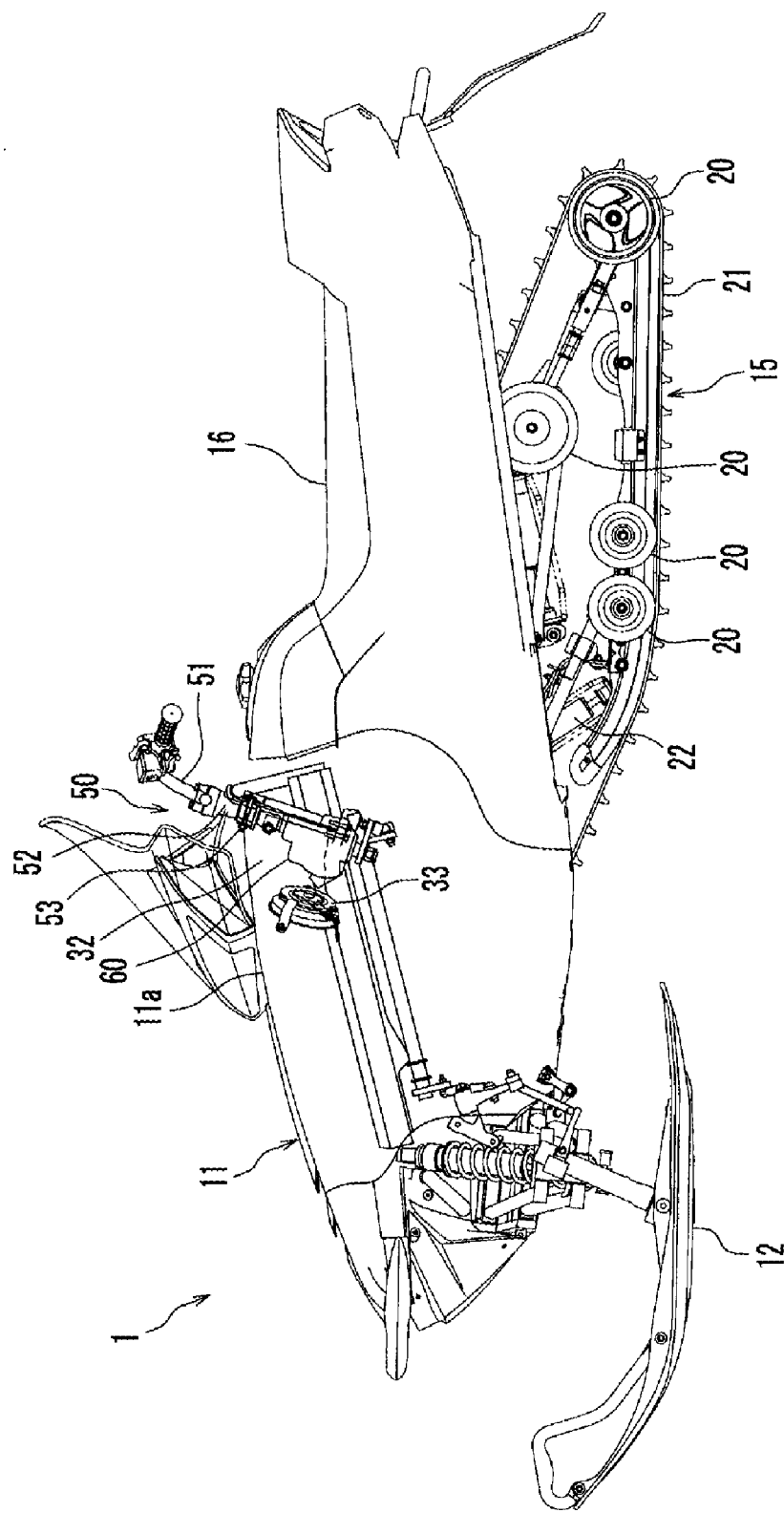
FIG. 9 is a left side view of a snowmobile in accordance with a modified example of the third preferred embodiment of the present invention.

The fan for cooling the power steering device 60 is not limited to the fan 31 for cooling the radiator 30. As shown in FIG. 9, a dedicated fan 33 exclusively for cooling the power steering device 60 may be provided, separately from the fan for cooling the radiator 30. In FIG. 9, the engine 14 and so forth are not shown. Also in this case, the power steering device 60 can be effectively cooled, and it is possible to more reliably prevent the power steering device 60 from being overheated. In the case where the dedicated fan 33 is provided, the engine may be either water-cooled or air-cooled.

Fourth Preferred Embodiment

Figure 10:
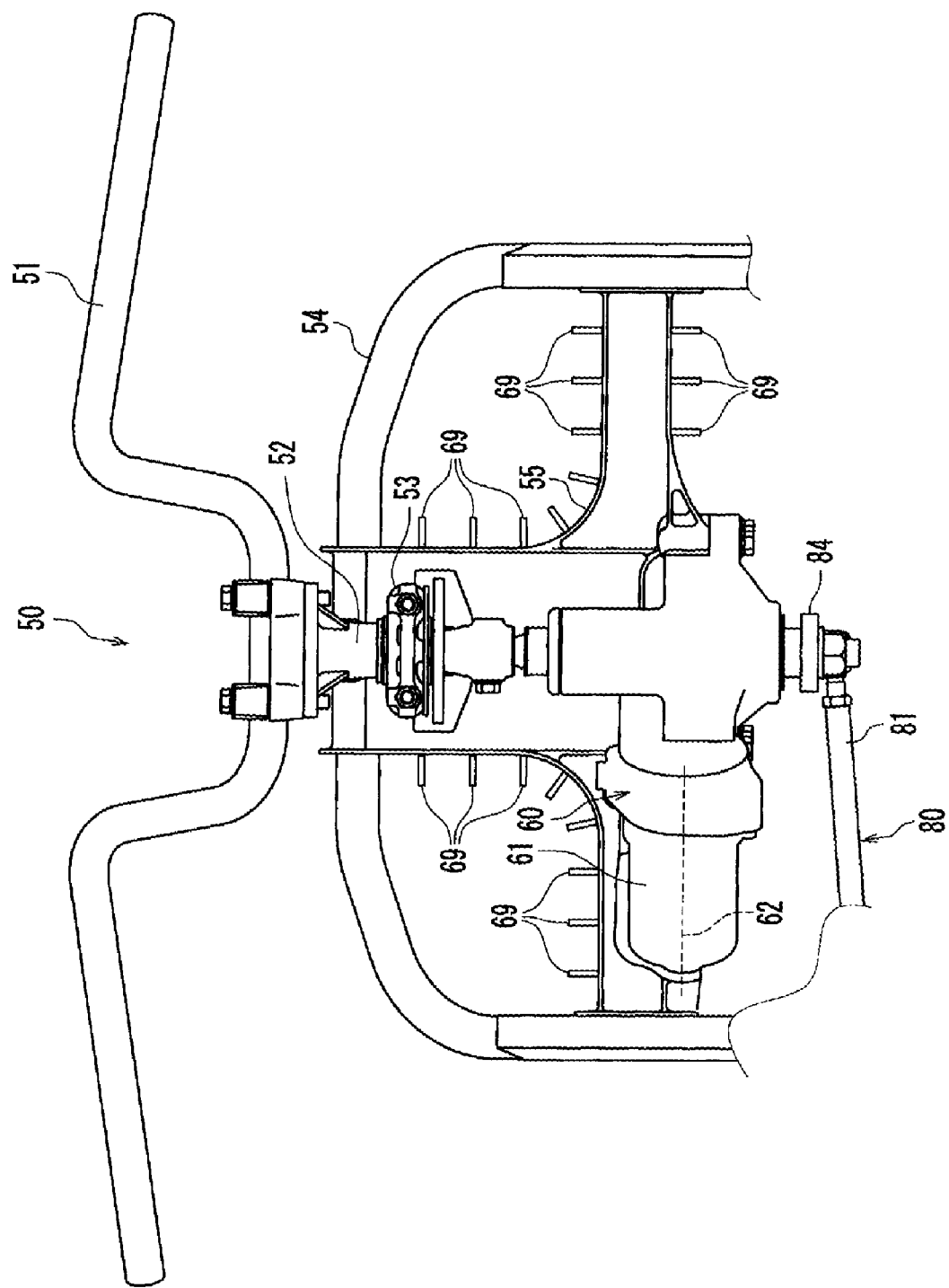
FIG. 10 is a front view of a steering column and a power steering device in accordance with a fourth preferred embodiment of the present invention.

As shown in FIG. 10, the snowmobile 1 in accordance with the fourth preferred embodiment is the snowmobile 1 of the first preferred embodiment in which cooling fins 69 are provided on the support bracket 55 to which the power steering device 60 is attached. Other components are the same as those of the first preferred embodiment, and are given the same reference numerals and are not described.

As shown in FIG. 10, in this preferred embodiment, a plurality of cooling fins 69 are provided on the support bracket 55. Thus, heat transmitted from the power steering device 60 to the support bracket 55 by heat conduction is easily dissipated from the support bracket 55, which in turn contributes to heat dissipation from the power steering device 60. As a result, it is possible to more reliably prevent the power steering device 60 from overheating.

The fourth preferred embodiment 4 may be combined with the third preferred embodiment. That is, the support bracket 55 may be provided with cooling fins 69, and in addition, a cooling fan for supplying air to the cooling fins 69 may be provided. The cooling fan may be either a fan for the radiator or a dedicated fan.

Fifth Preferred Embodiment

The medium for forcibly cooling the power steering device 60 is not limited to air. In the snowmobile 1 in accordance with the fifth preferred embodiment, snow blown up as the snowmobile 1 runs is utilized to cool the power steering device 60.

Figure 11:
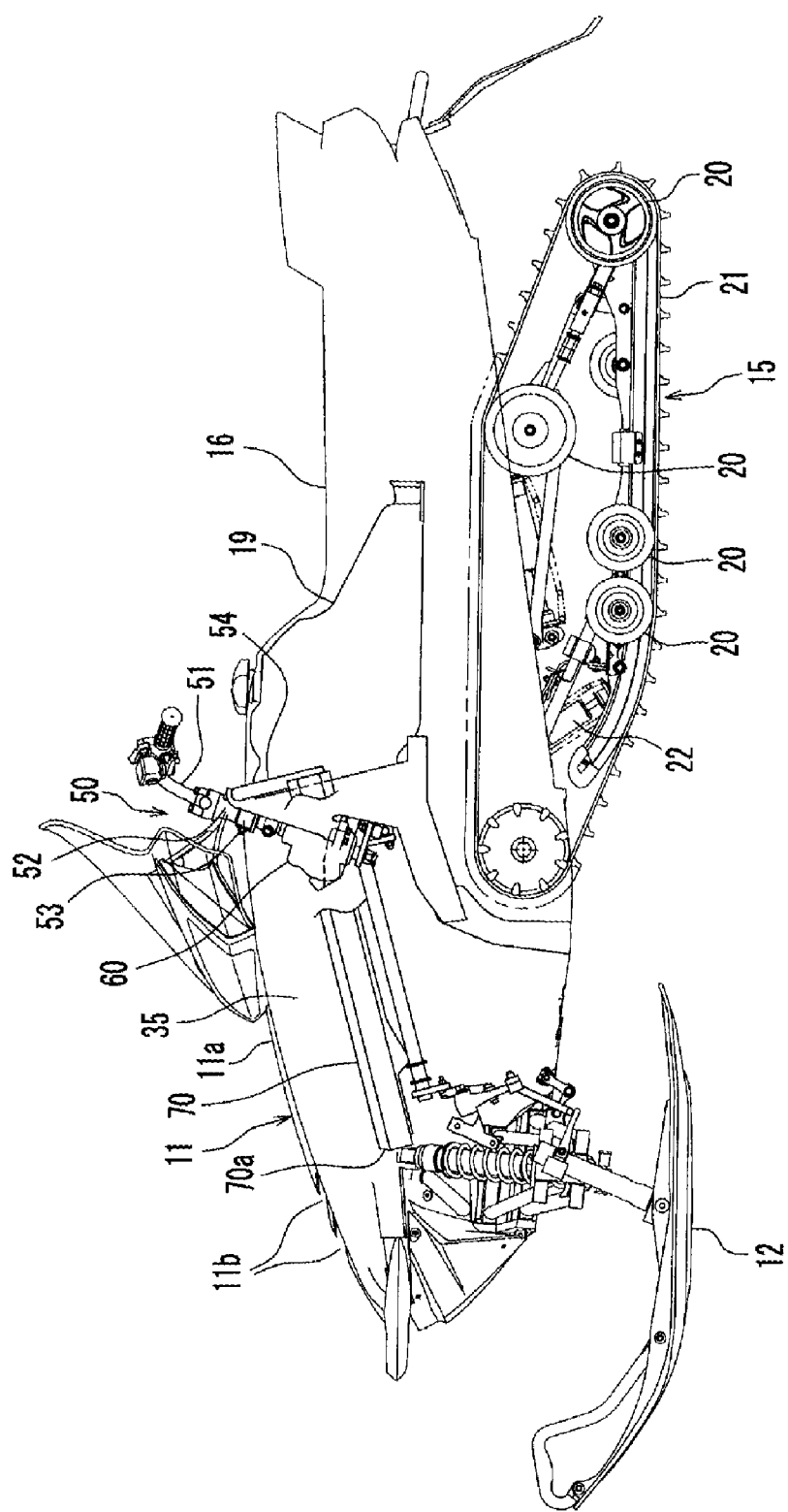
FIG. 11 is a left side view of a snowmobile in accordance with a fifth preferred embodiment of the present invention.

As shown in FIG. 11, the snowmobile 1 in accordance with this preferred embodiment includes a bar 70 extending obliquely forward and downward from the steering gate 54. The bar 70 is preferably made of a material with excellent heat conductivity such as aluminum. Also, the bar 70 is preferably fixed to the steering gate 54 such that the thermal resistance between the bar 70 and the steering gate 54 is as small as possible. For example, the bar 70 is preferably welded to the steering gate 54. As a matter of course, the bar 70 and the steering gate 54 may be integrated with each other.

A distal end 70*a* of the bar 70 is disposed in the front part of the vehicle body cover 11*a*. The vehicle body cover 11*a* is formed with air intake ports 11*b* for introducing air. In addition, a part of the front side and the lower side of the vehicle body cover 11*a* is open so that snow is introduced into an internal space 35 of the vehicle body cover 11*a* through that part. In other words, a space 35 for storing snow blown up as the vehicle runs is provided inside the vehicle body cover 11*a*.

Snow blown up as the vehicle runs is introduced into the internal space 35 of the vehicle body cover 11*a* to cool the bar 70 by contacting the bar 70. This increases heat dissipation from the bar 70, and in turn improves heat dissipation from the power steering device 60 via the bar 70. Thus, also in this preferred embodiment, it is possible to effectively prevent the power steering device 60 from overheating.

Although snow is utilized to indirectly cool the power steering device 60, snow may be utilized to directly cool the power steering device 60. That is, snow blown up may be caused to directly contact the power steering device 60. Also in this case, it is possible to effectively prevent the power steering device 60 from being overheated.

In the above-described preferred embodiments, the actuator of the power steering device 60 preferably is the electric motor 61. However, the actuator of the power steering device 60 may not necessarily be the electric motor 61, and may be a hydraulic motor, for example.

The present invention is not limited to the above-described embodiments, but various variations and modifications may be made without departing from the scope of the present invention. The presently disclosed preferred embodiments are therefore considered in all respects to be illustrative and not restrictive. The scope of the present invention is indicated by the appended claims rather than the foregoing description, and all changes which come within the meaning and range of equivalence thereof are intended to be embraced therein.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
   an engine;
   steering handlebars;
   a steering column attached to the steering handlebars and extending directly downward or obliquely downward;
   a power steering device attached to the steering column and including a sensor arranged to detect rotation of the steering column, a motor having a motor shaft tilted from both a fore and aft direction and a left and right direction of the snowmobile and driven based on a detection result of the sensor, and a rotary shaft disposed coaxially with the steering column;
   a power transmission mechanism arranged to transmit at least a driving force of the motor; and
   a ski coupled to the power transmission mechanism to be turned by the power transmission mechanism; wherein
   the power steering device is disposed rearward of the engine;
   the motor shaft is tilted rearward in the left and right direction of the snowmobile;
   the power steering device is attached to the steering column, such that a smallest dimension of the power steering device is oriented in a fore and aft direction of the vehicle, so that a length of the power steering device does not project forward or rearward of the smallest dimension in the fore and aft direction; and
   an axis of the motor shaft passes in front of the rotary shaft in the fore and aft direction.

2. The snowmobile according to claim 1, wherein the engine includes a cylinder head and an ignition plug extending obliquely upward and rearward from the cylinder head, the engine being disposed with at least the ignition plug positioned forward of the steering column, wherein the power steering device is disposed so as not to overlap the ignition plug as seen in an extending direction of the ignition plug.

3. The snowmobile according to claim 1, wherein the power transmission mechanism also transmits a rotating force of the steering column applied by the rider, along with the driving force of the motor.

4. The snowmobile according to claim 1, further comprising:
   a bearing for supporting the steering column; and
   a unitary support member arranged to support the bearing; wherein
   the power steering device is supported by the support member.

5. The snowmobile according to claim 4, wherein the support member is a die cast piece or a die cast piece of aluminum.

6. The snowmobile according to claim 4, wherein the rotary shaft and the steering column are spline connected to each other.

7. The snowmobile according to claim 4, wherein the power steering device is supported by and suspended from the support member.

8. The snowmobile according to claim 1, wherein a heat shield cover is disposed between the power steering device and the engine.

9. The snowmobile according to claim 8, wherein at least a portion of the heat shield cover is disposed below the power steering device.

10. The snowmobile according to claim 8, wherein the heat shield cover covers a lower side of the power steering device but not an upper side of the power steering device.

11. The snowmobile according to claim 8, further comprising an exhaust pipe arranged to exhaust an exhaust gas from the engine, wherein at least a portion of the heat shield cover is disposed between the power steering device and the exhaust pipe.

12. The snowmobile according to claim 8, wherein the engine is disposed obliquely forward of and below the power steering device, an upper end of the engine is positioned below an upper end of the power steering device and above a lower end thereof, and the heat shield cover extends from a position below the lower end of the power steering device to a position above the upper end of the engine.

13. The snowmobile according to claim 8, wherein the heat shield cover is disposed below the power steering device and has a downwardly convex cup shape.

14. The snowmobile according to claim 1, wherein the power steering device includes a casing made up of a plurality of members that can be assembled to each other, and a portion of the plurality of members is a part of a vehicle body component.

15. The snowmobile according to claim 14, wherein the vehicle body component is a support bracket attached to a steering gate.

16. The snowmobile according to claim 14, wherein the vehicle body component is a die cast piece or a die cast piece of aluminum.

17. The snowmobile according to claim 1, further comprising a fan arranged to supply air to the power steering device.

18. The snowmobile according to claim 1, further comprising:
   a radiator arranged to cool coolant to be supplied to the engine;
   a fan arranged to supply air to the radiator; and
   a vehicle body cover defining an air chamber and arranged to guide the air supplied from the fan; wherein
   the power steering device is disposed in the air chamber so as to be cooled by the air supplied from the fan; and
   the engine is water cooled.

19. The snowmobile according to claim 1, further comprising a dedicated fan exclusively provided to supply air to the power steering device.

20. The snowmobile according to claim 1, further comprising an attachment member to which the power steering device is attached and a cooling fin provided on the attachment member.

21. The snowmobile according to claim 1, further comprising a vehicle body cover defining a space arranged to guide snow blown up to the power steering device as the snowmobile runs.

22. The snowmobile according to claim 1, further comprising an attachment member directly or indirectly attached to the power steering device and a vehicle body cover defining a space arranged to guide snow blown up as the snowmobile runs to the attachment member.

23. A snowmobile comprising:
an engine having a crankshaft;
steering handlebars;
a steering column attached to the steering handlebars and extending directly downward or obliquely downward;
a power steering device attached to the steering column and including a sensor arranged to detect rotation of the steering column, a motor having a motor shaft tilted with respect to the crankshaft and driven based on a detection result of the sensor, and a rotary shaft disposed coaxially with the steering column;
a power transmission mechanism arranged to transmit at least a driving force of the motor; and
a ski coupled to the power transmission mechanism to be turned by the power transmission mechanism; wherein
the power steering device is disposed rearward of the engine;
the motor shaft is tilted rearward in a left and right direction of the snowmobile;
the power steering device is attached to the steering column, such that a smallest dimension of the power steering device is oriented in a fore and aft direction of the vehicle, so that a length of the power steering device does not project forward or rearward of the smallest dimension in the fore and aft direction; and
an axis of the motor shaft passes in front of the rotary shaft in the fore and aft direction.

24. A snowmobile comprising:
an engine having a plurality of cylinders arranged along a predetermined cylinder bank direction;
steering handlebars;
a steering column attached to the steering handlebars and extending directly downward or obliquely downward;
a power steering device attached to the steering column and including a sensor arranged to detect rotation of the steering column, a motor having a motor shaft tilted with respect to the cylinder bank direction of the engine and driven based on a detection result of the sensor, and a rotary shaft disposed coaxially with the steering column;
a power transmission mechanism arranged to transmit at least a driving force of the motor; and
a ski coupled to the power transmission mechanism to be turned by the power transmission mechanism; wherein
the power steering device is disposed rearward of the engine;
the motor shaft is tilted rearward in a left and right direction of the snowmobile;
the power steering device is attached to the steering column, such that a smallest dimension of the power steering device is oriented in a fore and aft direction of the vehicle, so that a length of the power steering device does not project forward or rearward of the smallest dimension in the fore and aft direction; and
an axis of the motor shaft passes in front of the rotary shaft in the fore and aft direction.

* * * * *